United States Patent [19]

Kamoshida

[11] 4,445,031
[45] Apr. 24, 1984

[54] LEADER TAPE DETECTING CIRCUIT

[75] Inventor: Tetsuzo Kamoshida, Saitama, Japan

[73] Assignee: Pioneer Electronic Corporation, Tokyo, Japan

[21] Appl. No.: 232,273

[22] Filed: Feb. 6, 1981

[30] Foreign Application Priority Data

Feb. 8, 1980 [JP] Japan .............................. 55-15424[U]

[51] Int. Cl.³ ............................................. G01N 21/86
[52] U.S. Cl. .............................. 250/214 RC; 250/561
[58] Field of Search ................... 250/571, 221, 222 R, 250/223 R, 560, 561, 214 R, 214 A, 214 RC, 570; 307/311; 356/386, 387; 226/4 S

[56] References Cited

U.S. PATENT DOCUMENTS

| | | | |
|---|---|---|---|
| 3,660,670 | 5/1972 | Howard | 250/561 |
| 3,673,414 | 6/1972 | Taniguchi et al. | 250/222 R |
| 3,812,372 | 5/1974 | Wirtz et al. | 250/561 |
| 3,932,746 | 1/1976 | Swanson | 250/221 |
| 4,166,948 | 9/1979 | Steffan | 250/222 R |

Primary Examiner—David C. Nelms
Attorney, Agent, or Firm—Sughrue, Mion, Zinn, MacPeak & Seas

[57] ABSTRACT

A leader tape detecting circuit which accurately detects the presence of a leader of a cassette tape independently of the type of tape or its condition. A light receiving element such as a phototransistor is disposed to detect the quantity of light passing through or reflected by the cassette tape. The output of the light receiving element is coupled directly to one input terminal of a comparator and through an integrator circuit to the other input terminal of the comparator. When the tape confronting the light receiving element changes from magnetizable tape to the leader, the quantity of light detected by the light receiving element changes and the output of the integrator circuit becomes different than that of the light receiving element. The detector produces an output signal representing this difference which is differentiated to produce the final output.

6 Claims, 7 Drawing Figures

LEADER TAPE DETECTING CIRCUIT

BACKGROUND OF THE INVENTION

The present invention relates to a leader tape detecting circuit which positively detects the leader tape of a cassette tape which includes both leader tapes and a magnetic tape.

Cassette tapes commonly used in a tape recorder include a magnetic tape coated and magnetic particles and two leader tapes connected to the two ends of the magnetic tape. The leader tapes are made of a transparent material or a light reflecting material. In a cassette tape recorder, it is often desired to control recording and reproducing operations by detecting the leader tape. In this connection, a conventional leader tape detecting circuit employs a technique wherein the quantity of light which has passed through or is reflected by the tape leader is sensed to detect the presence of the tape leader when the quantity of light thus sensed is larger than a predetermined reference value.

In the conventional leader tape detecting circuit described above, the reference value is fixed. Therefore, the leader tape detecting circuit may operate erroneously depending on the particular tape cassette type or due to variations with time of the tape. More specifically, if a different tape is used, the amount of light which passes through or is reflected by the tape changes. The amount of this light tends to change greatly after the tape has been used for a long period of time or if the tape becomes dirty. As a result, the relation between the preset leader tape detecting reference value set in the tape recorder and the quantity of light detected becomes incorrect so that detection of the leader tape cannot be satisfactorily carried out.

Accordingly, an object of the invention is to provide a leader tape detecting circuit which can positively detect a leader tape of any kind of cassette tape under any conditions.

SUMMARY OF THE INVENTION

In accordance with these and other objects, a leader tape detecting circuit is provided in which, whenever a magnetic tape comes to the leader tape detector, the level of the quantity of light passed through or reflected by the magnetic tape is stored as a leader tape detecting reference value in a capacitor. The arrival of a leader tape connected to the magnetic tape is determined when the level of the quantity of light passing through or reflected by the cassette tape becomes different from the reference value stored in the capacitor.

DESCRIPTION OF THE PREFERRED EMBODIMENTS

Figure 1:
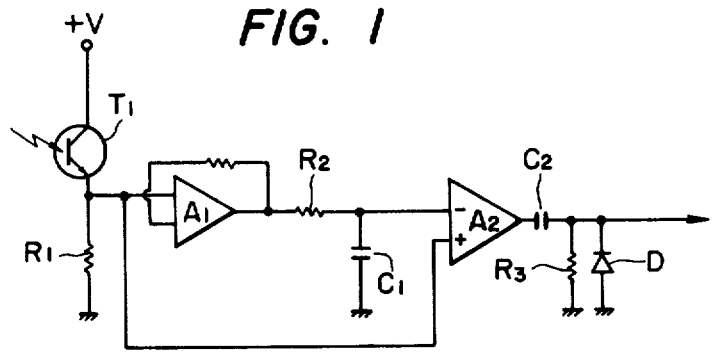
FIG. 1 is a circuit diagram showing a first preferred embodiment of a leader tape detecting circuit according to the invention.
Figure 2:
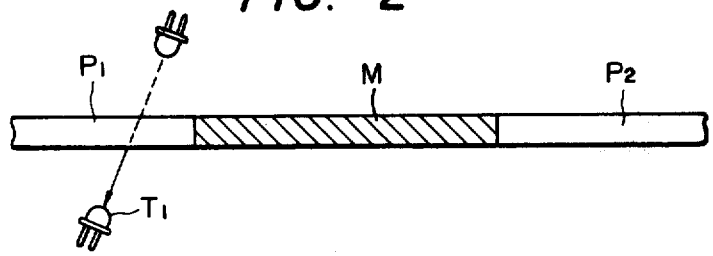
FIG. 2 is an explanatory diagram showing the positional relationship between a cassette tape and a phototransistor employed in the leader tape detecting circuit shown in FIG. 1.

FIG. 1 is a circuit diagram showing a preferred embodiment of a leader tape detecting circuit according to the invention. In the circuit shown in FIG. 1, light is constantly emitted from a light emitting source (shown in FIG. 2) which is applied through a tape to a phototransistor $T_1$ which detects the quantity of light transmitted through or reflected by the tape. The phototransistor $T_1$ is coupled between a voltage source $+V$ and ground through a resistor $R_1$. The output of the phototransistor $T_1$ is applied through a buffer amplifier $A_1$ to an integrator circuit composed of a resistor $R_2$ and a capacitor $C_1$. The integrated value is stored on the capacitor $C_1$.

The potential across the capacitor $C_1$, i.e. the value stored on the capacitor $C_1$, is applied to the negative (inverting) input terminal of a comparator $A_2$ to the positive (noninverting) input terminal of which the output of the phototransistor $T_1$ is applied. Accordingly, the comparator $A_2$ provides an output whose value corresponds to the difference between the two inputs to the comparator $A_2$. The output of the comparator $A_2$ is applied to a differentiation circuit which is composed of a capacitor $C_2$ and a resistor $R_3$. A diode D is coupled across the resistor $R_3$ so that only a positive output is provided by the differentiation circuit.

Figure 3A:
FIGS. 3A, 3B, 3C and 3D, taken together, are a timing chart showing waveforms of signals in the detecting circuit of FIG. 1.
Figure 3B:
Figure 3C:

With the leader tape detecting circuit thus constructed, when a part of the leader tape $P_1$ comes to confront the phototransistor $T_1$, the phototransistor $T_1$ is rendered conductive and an output corresponding to the quantity of light passing through the leader tape $P_1$ is provided on its output. The buffer amplifier $A_1$ generates an output in proportion to the magnitude of the output of the phototransistor $T_1$ which corresponds to the quantity of light passing through the leader tape $P_1$. The output of the buffer amplifier is supplied through the resistor $R_2$ to the capacitor $C_1$ where it is stored as a voltage value $V_1$ as shown in FIG. 3A. The voltage value stored on the capacitor $C_1$, namely, the potential $V_1$ across the capacitor $C_1$, is compared with the output $V_2$ (FIG. 3B) of the phototransistor $T_1$ by the comparator $A_2$. Initially, the values $V_1$ and $V_2$ are equal and therefore no output is provided by the comparator $A_2$ as indicated in FIG. 3C.

When the magnetic tape M comes to confront the phototransistor $T_1$, the quantity of light passing through the tape is greatly decreased and the output of the phototransistor $T_1$ becomes substantially zero. As a result, the potential across the capacitor $C_1$ falls as the capacitor $C_1$ is discharged as shown in FIG. 3A. The potential across the capacitor $C_1$ is continuously compared with the output of the phototransistor $T_1$ by the comparator $A_2$ as described above. Therefore, the comparator $A_2$ outputs a negative output as indicated by $Q_1$ in FIG. 3C only for the period for which the potential across the capacitor $C_1$ is dropping with this period being determined by the time constant defined by the resistor $R_2$ and the capacitor $C_1$. The negative output $Q_1$ is subjected to differentiation by the differentiation circuit composed of the capacitor $C_2$ and the resistor $R_3$. Because the differentiation result is negative, the output is clamped by the diode D so that no output signal is produced.

Figure 3D:

When the leader tape $P_2$ following the magnetic tape M comes to confront the phototransistor $T_1$, the quantity of light passing through the tape greatly increases and therefore the output of the phototransistor $T_1$ also greatly increases and the output of the buffer amplifier $A_1$ increases. As the output of the buffer amplifier $A_1$ increases, the potential across the capacitor $C_1$ is increased, and as shown in FIG. 3A, the capacitor $C_1$ is charged. Therefore, the comparator $A_2$ outputs a positive pulse, indicated by $Q_2$ in FIG. 3C, for the period until the potential across the capacitor $C_1$ has reached a steady value. The positive pulse $Q_2$ is subjected to differentiation by the differentiation circuit composed of the capacitor $C_2$ and the resistor $R_3$. As a result, a positive output as shown in FIG. 3D is outputted as the leader tape detection signal.

Figure 4:
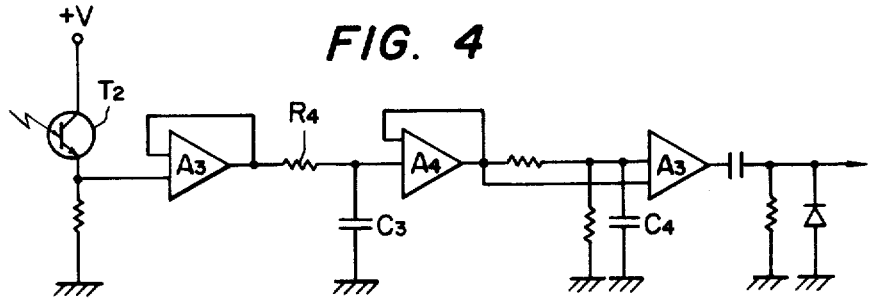
FIG. 4 is a circuit diagram showing a second preferred embodiment of a leader tape detecting circuit according to the invention.

Although an embodiment has been described in which light is constantly applied to the tape, it is possible to employ a light emitting source of the type from which light is intermittently emitted at a constant frequency. In such a case, it is desirable that the frequency of the intermittent light emitted be different from the power line frequency and its integer multiples in order to avoid interference. The circuit diagram of such an embodiment is shown in FIG. 4. In this circuit, the output of the phototransistor $T_2$ is buffered by a first AC amplifier $A_3$ whose output is filtered by a circuit including a resistor $R_4$ and a capacitor $C_3$. The filtered signal is further buffered by a second AC amplifier $A_4$ the output voltage of which is stored on a capacitor $C_4$. The potential across the capacitor $C_4$, that is, the voltage value stored on the capacitor $C_4$, is applied to one input of a comparator $A_5$ to the other input of which the output of the phototransistor $T_2$ is applied through the first and the second AC amplifiers $A_3$ and $A_4$. In this embodiment, it is essential in view of preventing interference from light coming other than from the light source to determine the time constant t of the circuit including the resistor $R_4$ and the capacitor $C_4$ to satisfy the relation $t > 1/f$ where f is the power line frequency. This embodiment is advantageous in that stabilized operation is achieved due to the employment of the AC amplifiers.

As is apparent from the above description, in the leader tape detecting circuit according to the invention, the detection signal is outputted only when the leader tape following the magnetic tape comes to confront the phototransistor. Thus, the detecting circuit is quite suitable for accurately detecting the leader tape. Furthermore, the quantity of light passing through or reflected by the leader tape is stored as the reference value for discriminating the leader tape. Thus, the leader tape detecting circuit according to the invention is advantageous in that, even if the tape type is changed or the tape becomes dirty, the leader tape can be positively detected. In addition, it is evident that the transition from the leader tape to the magnetic tape can be detected with the leader tape detecting circuit if desired.

What is claimed is:

1. A leader tape detecting circuit comprising:
   a light receiving element operatively disposed for detecting a quantity of light one of passing through and reflected by a cassette tape;
   an integrator circuit coupled to an output of said light receiving element; and
   a comparator directly connected to said output of said light receiving element and said integrator circuit for detecting a difference between an output of said integrator circuit and said output of said light receiving element.

2. The leader tape detecting circuit of claim 1 further comprising differentiator circuit means coupled to an output of said comparator.

3. The leader tape detecting circuit of claim 2 further comprising a diode coupled to said differentiator circuit for providing a unipolar output.

4. A leader tape detecting circuit comprising: a phototransistor; a buffer amplifier having an input coupled to an output of said phototransistor; a comparator having a first input directly connected to said output of said phototransistor; a first resistor coupled between an output of said buffer amplifier and a second input of said comparator; a first capacitor coupled between said second input of said comparator and a ground; a second capacitor having a first terminal coupled to an output of said comparator; a second resistor having a first terminal coupled to a second terminal of said second capacitor and a second terminal coupled to ground; and a diode coupled in parallel to said second resistor.

5. A leader tape detecting circuit comprising: a phototransistor; a first buffer amplifier having an input coupled to an output of said phototransistor; a second buffer amplifier; a first resistor coupled between an output of said first buffer amplifier and an input of said second buffer amplifier; a first capacitor having a first terminal coupled to said input of said second buffer amplifier and a second terminal coupled to a ground; a comparator having a first input directly connected to an output of said second buffer amplifier; a second resistor coupled between said output of said second buffer amplifier and a second input of said comparator; a third resistor having a first terminal coupled to said second input of said comparator and a second terminal coupled to ground; a second capacitor coupled in parallel to said third resistor; a third capacitor having a first terminal coupled to said output of said comparator; a fourth resistor having a first terminal coupled to a second terminal of said third capacitor and a second terminal coupled to ground; and a diode coupled in parallel to said fourth resistor.

6. The leader tape detecting circuit of claim 5 wherein a time constant of said first resistor and said first capacitor is greater than the reciprocal of a power line frequency.

* * * * *